Nov. 11, 1958 E. D. MENG ET AL 2,860,310
VARIABLE BANDWIDTH CRYSTAL FILTER CIRCUITS OR THE LIKE
Filed June 30, 1954

EUGENE D. MENG
NEIL T. KEYES
PATRICK M. CREUTZ
*INVENTOR.*
BY [signature]
THEIR ATTORNEY

United States Patent Office 2,860,310

Patented Nov. 11, 1958

2,860,310

VARIABLE BANDWIDTH CRYSTAL FILTER CIRCUITS OR THE LIKE

Eugene D. Meng, Torrance, and Neil T. Keyes and Patrick M. Creutz, Los Angeles, Calif., assignors to Hoffman Radio Corporation, a corporation of California Application June 30, 1954, Serial No. 440,374

2 Claims. (Cl. 333—72)

This invention is related to variable bandwidth circuits and, more particularly, to an improved variable bandwidth crystal filter circuit which is suitable for being coupled directly to the output of a cathode follower stage.

In the past, many attempts have been made to design satisfactory variable bandwidth crystal filter circuits. Invariably certain problems are encountered which render crystal filter circuits presently in use deficient in some respect. One difficulty lies in the fact that when the bandwidth is increased, the stage gain drops. Also, for certain types of electronic apparatus, it may be desirous to couple directly to the output circuit of a conventional cathode follower. Some types of electronic equipment are physically designed to include the pre-selector stages, the converter, and the low level limiter circuitry in one unit, and to include the variable bandwidth crystal filter circuit, the intermediate frequency amplifier strip, and the rest of the receiver in another unit. In such a case, the circuitry of the first unit will be terminated in a cathode follower stage so that both units may be coupled together by a conventional coaxial line. Hence, the variable bandwidth crystal filter circuit of the second unit should be designed for direct coupling through the coaxial line to the cathode follower stage of the first unit.

Therefore, it is an object of this invention to provide an improved variable bandwidth crystal filter circuit.

It is a further object of this invention to provide a variable bandwidth crystal circuit which will exhibit constant gain characteristics despite variations in bandwidth.

It is an additional object of this invention to provide an improved variable bandwidth crystal filter circuit which may be coupled directly to the output circuit of a cathode follower.

According to this invention, the crystal filter circuit employs a variable bandwidth control and also a variable gain control. These two controls are adjusted simultaneously to preserve constant gain at all bandwidth settings. These controls may be ganged if so desired. Further, this invention adopts a new type of bridge circuit which is readily adaptable to being driven by the low-impedance output of a cathode follower.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figures 1, 2, 3:
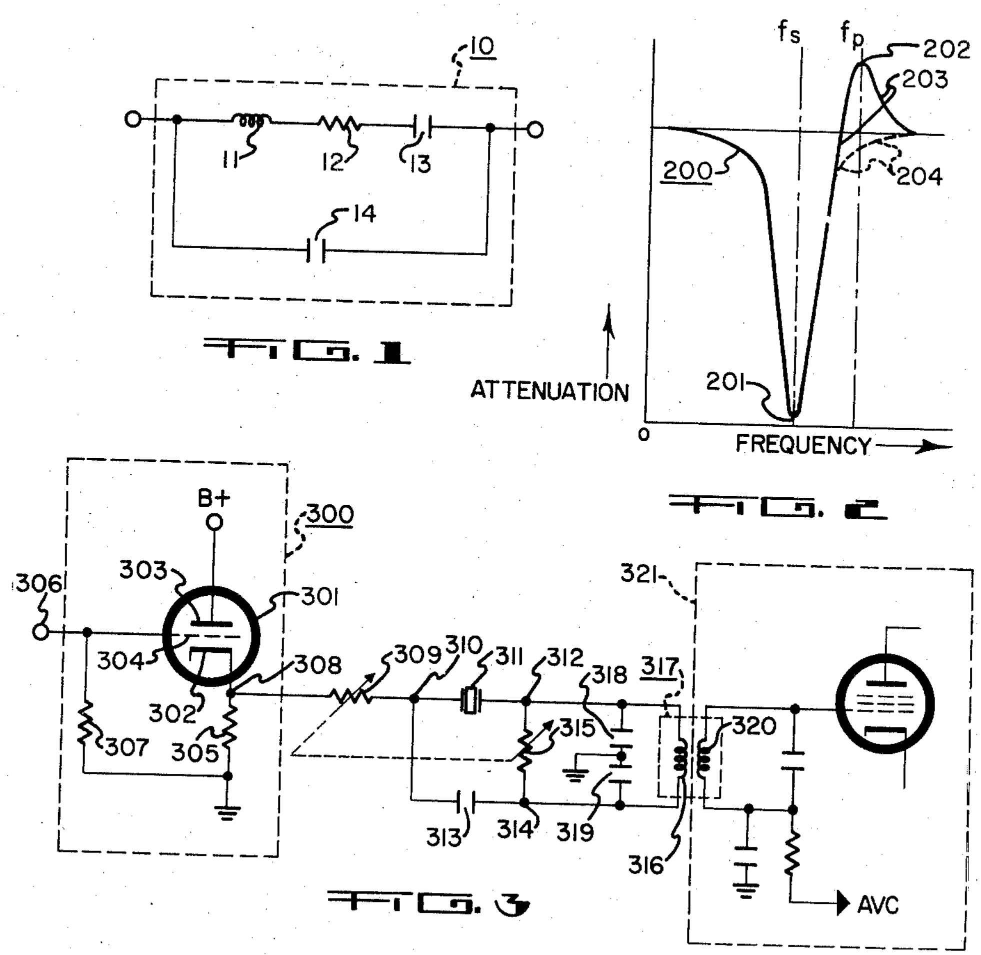
Figure 1 is a schematic diagram of the equivalent circuit of a crystal employed in the present invention.
Figure 2 is a graphical representation of the frequency response curve of the crystal, the schematic diagram of which is shown in Figure 1.
Figure 3 is a schematic diagram of the variable bandwidth crystal filter circuit of the present invention which couples a cathode follower stage to a subsequent intermediate frequency amplifier stage.

In Figure 1, crystal filter 10 is represented schematically by inductor 11, resistor 12 and capacitor 13 coupled in series, in that order. This series circuit is shunted by capacitor 14.

The transmission characteristics of a representative crystal is indicated by the frequency response curve 200 of Figure 2. Response curve 200 is obtained by plotting attenuation versus frequency for a conventional crystal filter. Point 201 on response curve 200 represents the point of series resonance of the crystal. Point 202 of response curve 200 represents the point of parallel resonance of the crystal. As is well known to those skilled in the art, crystal filters have the unique characteristic of a very sharp series resonance curve, as is indicated in Figure 2. However, skirt selectivity is impaired by virtue of the existence of shunting capacitor 14 (see Figure 1) of the crystal equivalent circuit, as is indicated by portion 203 of response curve 200. It is desirable that response curve 200 should follow curve configuration 204 rather than portion 203. This may be accomplished by using a bridge circuit. According to the present invention, the novel bridge circuit of Figure 3 is utilized to obtain the desired response curve.

In Figure 3, cathode follower stage 300 includes a vacuum tube 301 having cathode 302, anode 303, and control electrode 304. Cathode 302 is connected through cathode load resistor 305 to ground. Anode 303 is connected directly to a source of positive voltage (B+). Control electrode 304 is connected to input terminal 306 and also through input resistor 307 to ground. Terminal 308 of cathode load resistor 305 is connected through variable resistor 309 to terminal 310. Terminal 310 is connected through crystal 311 to terminal 312. Terminal 310 is also connected through neutralizing capacitor 313 to terminal 314. Terminals 312 and 314 are the end-terminals of variable resistor 315. Variable resistor 315 is shunted by primary winding 316 of interstage transformer 317 and also by a capacitance leg which includes capacitors 318 and 319. The junction of capacitors 318 and 319 is grounded. Secondary winding 320 of interstage transformer 317 is connected to the input circuitry of subsequent amplifier stage 321.

Figure 4:
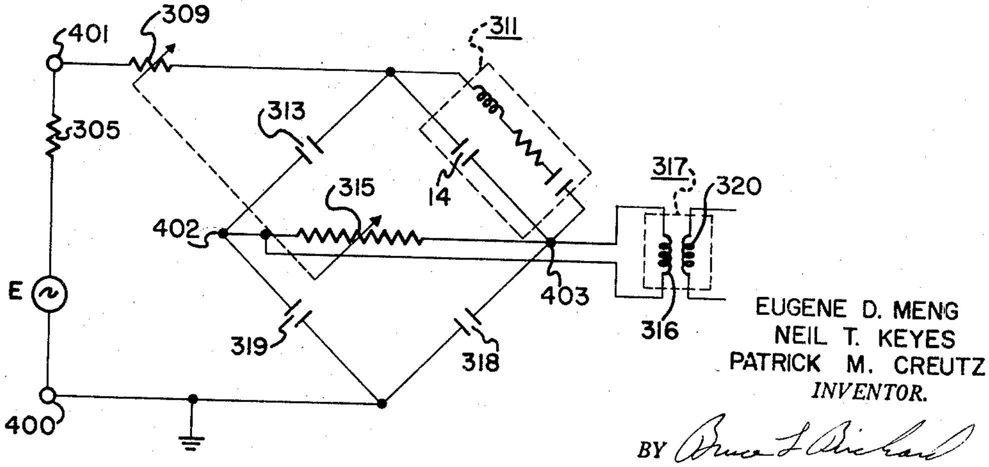
Figure 4 is a schematic diagram of the equivalent circuit of a variable bandwidth crystal filter circuit shown in Figure 3.

The operation of the circuitry of Figure 3 can be best described by re-drawing the circuit to the configuration shown in Figure 4. The low-impedance output of cathode follower stage 300 acts as a generator having a low source impedance. This is illustrated in Figure 4 by generator source E and resistor 305, between generator terminals 400 and 401. The bridge circuit above referred to consists of capacitors 318, 319, neutralizing capacitor 313, and crystal 311. Terminals 402 and 403 of the bridge circuit are coupled together through variable resistor 315. The output signal is taken from variable resistor 315 and is applied to primary winding 316 of interstage transformer 317.

The circuit shown in Figure 4 operates as follows. The cathode follower provides a low-driving impedance for the crystal filter circuit. The bridge circuit is so designed that at the parallel resonant frequency of the crystal no current will flow through variable resistor 315. That is, at the frequency of parallel resonance of the crystal the ratio of the reactances of capacitors 14 (of the crystal) and 318 will be made equal to the ratio of the reactances offered by capacitors 313 and 319. In this manner, the series resonant skirt selectivity of the crystal will be undisturbed, and, referring to Figure 2, portion 203 of response curve 200 will assume the configuration shown by dotted curve portion 204. In the manner above described, the effective shunting capacitor of the crystal is balanced out and the only signal appearing across variable resistor 315 will be that contributed by the series resonance action of the crystal upon the cathode follower output signal. By varying the resistance offered by variable resistor 315, the gain and bandwidth will also vary. However, by the insertion of variable resistor 309, the amplitude of the signals supplied to stage 321 (of Figure 3) may be made constant despite changes in bandwidth. In actual practice, the variable arms of resistors 309 and 315 may be ganged so that as the effective resistance of one is decreased, the effective resistance of the other is decreased automatically.

Hence, it is seen that this invention provides a novel variable bandwidth crystal filter circuit which is readily adaptable for coupling directly to the output of a conventional cathode follower, and which also preserves constant gain despite variations in bandwidth.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A variable bandwidth crystal filter circuit including, in combination, a bridge circuit having first, second, and third capacitors and a crystal to form the four branches of said bridge circuit, a first variable resistor coupled between two opposite branch-junctions of said bridge circuit, an input circuit coupled between the remaining two opposite branch-junctions of said bridge circuit, said input circuit including a series connected, second variable resistor, said first and second variable resistors being ganged for simultaneous variation in the same sense whereby the output signal amplitude will be maintained substantially constant independent of bandwidth variation by said first variable resistor, and an output circuit coupled across said first variable resistor, said filter circuit having a pass band determined by the effective series-resonant frequency of said crystal and a bandwidth determined by said first variable resistor.

2. A variable bandwidth translating network including, in combination, a cathode follower stage having an output cathode load resistor, a bridge circuit having first, second, and third capacitors and a crystal to form the four branches of said bridge circuit, a first variable resistor coupled between two opposite branch-junctions of said bridge circuit, one terminal of said cathode load resistor of said cathode follower being coupled to one of the remaining branch-junctions of said bridge circuit, a second variable resistor being coupled to the remaining terminal of said cathode load resistor and also to the remaining branch-junction of said bridge circuit, said first and second variable resistors being ganged for simultaneous variation in the same sense whereby the output signal amplitude will be maintained substantially constant independent of bandwidth variation by said first variable resistor, and an output circuit coupled across said first variable resistor, said translating network having a passband determined by the effective series-resonant frequency of said crystal and a bandwidth determined by said first variable resistor.

References Cited in the file of this patent

UNITED STATES PATENTS

| | | |
|---|---|---|
| 1,628,983 | Johnson | May 17, 1927 |
| 1,987,984 | Barden | Jan. 15, 1935 |
| 2,350,869 | Bliss | June 6, 1944 |
| 2,396,224 | Artzt | Mar. 12, 1946 |
| 2,452,114 | Farkas | Oct. 26, 1948 |

FOREIGN PATENTS

| | | |
|---|---|---|
| 853,362 | France | Nov. 28, 1939 |
| 878.813 | France | Nov. 2. 1942 |